United States Patent
Kobayashi et al.

(10) Patent No.: US 6,220,745 B1
(45) Date of Patent: Apr. 24, 2001

(54) DEVICE AND MONITORING SYSTEM FOR REMOVING LIQUID FROM HIGH MELTING POINT RESIN BY MEANS OF CO-ROTATING TWIN SCREW EXTRUDER

(75) Inventors: Akiyoshi Kobayashi; Junya Ishibashi, both of Shizuoka-ken (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 08/899,824

(22) Filed: Jul. 24, 1997

(30) Foreign Application Priority Data

Jul. 24, 1996 (JP) .................................... 8-195019

(51) Int. Cl.[7] .................................................. B29C 47/38
(52) U.S. Cl. .............................. 366/83; 366/88; 366/142; 366/291; 366/301; 366/319; 425/203; 425/378.1; 528/501

(58) Field of Search ................................ 366/83, 84, 301, 366/88, 142, 291, 319; 425/203, 378.1; 528/501

(56) References Cited

U.S. PATENT DOCUMENTS 3,742,093 * 6/1973 Skidmore .......................... 528/501 X
4,117,548 * 9/1978 Craig ...................................... 366/83

* cited by examiner

*Primary Examiner*—Fred Teskin
(74) *Attorney, Agent, or Firm*—McGuireWoods LLP

(57) ABSTRACT

A method of and device for removing a liquid from a resin of high melting point by means of a co-rotating twin extruder and an operation system of a liquid removal molding of a resin of high melting point by which a scaled down, highly effective, high performance and continuous stable operation of the device may be achieved.

17 Claims, 6 Drawing Sheets

| Ns rpm | Q kg/H | Z kW | Z/Q kWH/kg | Tr °C | REMARKS |
|---|---|---|---|---|---|
| 350 | 120 | 39 | 0.325 | 307 | MATERIAL WATER CONTENT: 20% A STABLE OPERATION IS POSSIBLE |
| 350 | 120 | | | | MATERIAL WATER CONTENT: 30% A FLAKE UP FROM A VENT PORTION IS OCCURRED |

Ns = SCREW VELOCITY    Q = QUANTITY OF MATERIAL EXTRUSION
Z = MOTOR POWER    Tr = MATERIAL HIGHEST (MELTING) TEMPERATURE

| Ns rpm | F kg/H | q kg/H | Z kW | Z/Q kWH/kg | Tr C | Ph kg/cm | Vl cm/Hg | REMARKS |
|---|---|---|---|---|---|---|---|---|
| 370 | 215 | 155 | 55.6 | .359 | 307 | 2.0 | −40 | A STABLE OPERATION IS POSSIBLE A FLAKE UP FROM A VENT PORTION IS NOT OCCURRED |
| ↑ | ↑ | ↑ | 56.0 | .361 | 307 | 1.9 | −40 | ↑ |
| ↑ | ↑ | 158 | 55.8 | .353 | 306 | 2.0 | −40 | ↑ |
| ↑ | ↑ | ↑ | 55.0 | .348 | 306 | 2.1 | −40 | ↑ |
| ↑ | ↑ | 156 | 55.6 | .356 | 304 | 1.7 | −40 | ↑ |
| 500 | 275 | 199 | 77.9 | .391 | 307 | 1.2 | −50 | ↑ |
| ↑ | ↑ | ↑ | 75.2 | .378 | 309 | 1.0 | −50 | ↑ |

DEVICE AND MONITORING SYSTEM FOR REMOVING LIQUID FROM HIGH MELTING POINT RESIN BY MEANS OF CO-ROTATING TWIN SCREW EXTRUDER

BACKGROUND OF THE INVENTION (1). Field of the Invention

The present invention relates to a method of removing liquids from water containing resin of high melting point over 200° C., and more particularly to a monitoring system for removing liquids from the high melting point resin by melt-kneading in a co-rotating twin screw extruder for removing the water component with extrusion, and method and apparatus as well as molding thereof.

(2). Background Information

Generally, resin materials produced in a polymer manufacturing process of thermoplastic resins or ground materials produced in a recycling process of the waste plastic products (hereinafter simply referred to as resin materials) contain a relatively large quantity of liquid so that a liquid removing process is required to remove the water component at the end of each process.

Hitherto, in a manufacturing process of ABS (acrylonitrile butadiene styrene) resins for example, a flow drying oven and the like have conveniently been used. ABS latex manufactured by an emulsion polymerization may be obtained as a slurry which contains a large quantity of liquid after coagulation and water washing. As a method of removing liquids, the slurry is supplied into a centrifugal dehydroextruder for obtaining a water containing powder or a wet cake containing water in the range of 30%–40%. The water containing powder is dried until the water content reaches 1% by heat energy using a drying pipe and a flow drying oven to avoid compounding by an extruder in the final process, a vent-up and a blowing phenomenon in a granulation process.

In the drying process, the approximately 30%–4% water component of the powder or cake is vaporized by consuming large quantities of heat energy and time. The powder of lower water content in almost dried state is associated with a risk of dust explosion so that the device as a whole needs to be isolated from oxygen with a hot nitrogen gas and a larger scale of the facility.

A resin material of approximately 1% water content is supplied to a co-rotating twin screw extruder for the ultimate dryness followed by compounding and granulating.

For a scale down version of the device, a method of removing liquids by means of a co-rotating twin screw extruder has been proposed. A water removing system of this type generally comprises a squeeze process and a vaporization process.

In the liquid removing method of the squeeze type as illustrated in FIG. 9, for example, a co-rotating twin screw extruder 10 is mounted with a co-rotating twin screw 14 in a barrel 12 and provided with a material feeding section (or port) 16 to which is supplied a mixture of a water containing powder 30a, a pellet 30b and a process adjuvant 30c of the resin material 30 from which liquids are previously removed by a centrifugal hydroextruder 32. It is proposed to provide such structure so that the resin material within the mixture is squeezed at the liquid removing screw portion (not shown) of the screw 14 so that the resin material is mold-extruded as a solid from a delivery (outlet) 18.

ABS water containing powder 30a of water content of 30%–40% reduced by the centrifugal hydroextruder 32 is supplied to the material feeding section 16 at the uppermost stream of the co-rotating twin screw extruder 10 together with other materials such as SAN (styrene and acrylonitrile copolymer) pellet 30b and the process adjuvant 30c. The material supplied to the material feeding section 16 is conveyed effectively to the lower stream without retention by the twin screw 14 having a self-cleaning finction. The material being conveyed is squeezed by a liquid removing screw portion 24 comprising a kneading block and a reverse-flighted screw provided in the twin screw 14, whereby the material is elastically or plastically deformed for reduction of the specific volume of the material so that the water component in the material is removed as a liquid.

The liquid separated flows in reverse through the screw channel against the upper stream of the liquid removing screw portion 24 along a pressure gradient directing from a maximum pressure point of the liquid removing screw portion to the material feeding section 16 and is discharged from a delivery 20 (water removing screen) provided between the upper stream of the liquid removing screw 24 and the material feeding section 16. At this section, approximately 30%–90% of the entire water component in the resin material is separated and discharged, and approximately 10%–70% of the remaining water component is separated and vaporized through vent holes 22a, 22b and 22c of the vent portion provided at the lower stream of the liquid removing screw, and is finally vaporized through the vent hole 22c and the resin is extruded from the delivery 18.

According to the liquid removing method of the aforementioned type, a certain quantity of water is removed from the resin material in the form of liquid without vaporization so that water vaporization energy effectiveness may be improved. Since the wet material is used, a risk of dust explosion may be avoided without any particular device for sealing oxygen with minimized scale of a facility. Further, in accordance with the liquid removing method of this type, continuation of the manufacturing process, simplification of the multi-stage processes and drastic rationalization of the manufacturing process may be achieved.

In the liquid removing method of the squeeze process as proposed in FIG. 10, for example, a method of removing the liquid is similar to the aforementioned system but a method of discharging the liquid is different. Namely, in the former method of the squeeze process, a separated liquid is flowed in reverse and discharged from the liquid removing screen located in the upper stream of the liquid removing screw portion. In the process shown in FIG. 10, however, to separate and evaporate water the liquid removing portion 34 is provided with a discharge port 35 at a portion where the resin material is compressed and with a vent staffer means 36 to prevent a material from flowing out the discharge port. Other structures are the same as those of the liquid removing method as hereinbefore described.

The liquid removing method free of water reverse flow may expand the operational conditions and this method is well tolerated to a recycling process of the waste plastics.

Further, another liquid removing method of the vaporization process has been proposed as illustrated in FIG. 11 where SAN pellet and water containing ABS powder are supplied into the twin extruder 10 from different places.

Namely, to remove the liquid SAN (styrene and acrylonitrile copolymer), a pellet 30b is supplied to the extruder 10 for quick melting, to which preheated water containing ABS powder 30a with the process adjuvant are added by means of a side feeder 37 having a preheating means in the middle portion of the extruder. Thus, the water component is steamed by an enthalpy of the molten SAN so that the separated and vaporized steam is discharged from the vent holes 22a, 22b and 22c of the vent portion 22.

Accordingly, in the liquid removing method of the type as hereinbefore described, the wet material is also used to avoid any risk of the dust explosion without necessitating any facility to isolate oxygen and to minimize an arrangement. A residual monomer value obtained after devolatilization from the vent hole 22c is better than that of the liquid removing method of the squeeze process as hereinbefore described and the liquid removing method of this type is well tolerated in the case where a material of two components, for example, containing ABS diluted by SAN is adopted.

In the aforementioned conventional liquid removing method of the squeeze process, however, a melting point, a glass transition point or a heat distortion temperature is extremely high as compared with a boiling point of water, and when liquid is removed from the solid resin material of more than 10% water content by means of the co-rotating twin extruder, more power is required as compared with that of the material of low melting point such as ABS. Namely, according to the conventional liquid removing method, a water containing material is squeezed by a propelling force of the screw at the squeeze liquid removing screw comprising a kneading block and/or a reverse-flighted screw provided in the extruder in order to remove liquid by an elastic or plastic deformation. The materials of low melting point such as ABS have the melting points which are similar to or lower than the boiling point of water so that they are elastically or plastically deformed at a relatively lower temperature and pressure by a minimized energy of the screw for the material and a smaller power of the extruder.

Materials of high melting points such as engineering plastics, however, have a melting point, a glass transition point or a heat distortion temperature that is extremely higher than the boiling point of water and may not conveniently be elastically or plastically deformed. For convenient deformation, a temperature of the material at the squeeze liquid removing screw portion may be elevated, notwithstanding that a heat energy may not be supplied to satisfy the necessary evaporation latent heat. Accordingly, it is inevitable to increase the pressure of the squeeze liquid removing screw portion to an extremely high level by applying a large quantity of energy from the screw to the material resulting in an expansion of the power supply. In the co-rotating twin screw extruder where the screw torque is limited on account of the mechanical strength, a large power is required to remove the liquid with reduction of the processing capacity and deterioration of the energy effectiveness losing advantages described hereinbefore.

For example, when resins of high melting points are subjected to the liquid removing procedure without using any particular screw for increasing the pressure at the squeeze liquid removing screw portion or any other means necessary for increasing the power, water is not discharged from the discharge port and a flake up phenomenon occurs to flow the material up from the vent portion at the lower stream. To remove the liquid from the resins of high melting points using such a conventional liquid removing method results in loss of the advantages of liquid removal molding by means of the twin screw extruder which purports to provide an improvement in the energy effectiveness with worthlessness as an industrial facility.

The aforementioned conventional liquid removing method of the vaporization process is effective to the materials containing more than two components of a combination of the water containing materials with other resins but is not applicable to the engineering plastics containing of essentially one component and having a high melting point.

The liquid removing method of this kind stands on an energy balance between water containing materials and other materials. Generally, an evaporation latent heat is greater than an enthalpy of molten resin, and the liquid remove molding method may not be carried out because of loss of the energy balance when water content of the resin material is increased on account of increments of the water content and mixing ratio of the water containing materials, and in this situation, a flake-up phenomenon appears to fly up the material from the vent portion at the lower stream. According to the heat balance of the ABS liquid remove molding method, the water content of the resin material is generally limited to the range of 8%–10%.

The conventional liquid removing method is not applicable to the liquid remove molding of the engineering plastics of essentially one component and even if applicable, the scope of the application is extremely limited because of the energy balance.

BRIEF SUMMARY OF THE INVENTION

An object of the present invention is to provide a system or method and apparatus for removing a liquid from a resin of high melting point by means of the co-rotating twin extruder of minimized scale with high effectiveness, high performance and continuous stable operation and to provide an operation monitor system for liquid removing method and apparatus as well as liquid removal molding of resins of high melting point.

In order to achieve the foregoing object, the method of removing the liquid from a resin of high melting point by means of a co-rotating twin extruder according to the present invention is characterized in that a water containing resin of high melting point is compressed in the co-rotating twin extruder for extrusion molding, a vent portion is provided between a feeding section and an outlet of the extruder of the resin material, a screw zone between the vent portion and the feeding section is formed as a melt-kneading screw which serves only to melt and/or knead but not to compress, a screw is provided with a heating means to form a melt-kneading section, and that in the melt-kneading section the water component is separated and vaporized, and that the water vapor and other volatile components are induced into and discharged from the vent portion.

In the invention, the screw is comprised of a full flighted screw and a kneading block with a length-to-diameter (L/D) ratio of 50–60, a vent portion comprises an air opening vent and/or a vacuum vent for discharging the water vapor and other volatile components in the barrel and is arranged at least one in the position of L/D ratio of 5–20 from a tip portion of the screw which is provided with an outlet for forming the resin material into a shape of pellet, the resin material is melt-kneaded by an incoming heat from the barrel and a shearing force of the screw for simultaneous separation and vaporization of the water component, and the water vapor generated is induced into and discharged from the vent portion to avoid a reverse flow of the water vapor to the feeding section of the resin material.

Further, a compactor of horizontal or vertical type having a single or twin screw is provided in a feeding section of the resin material to avoid a deterioration of processing capacity of the extruder which is caused by a gas contained in the resin material melt-kneaded in the melt-kneading section of the screw and reverse flowed into the feeding section to liquidize the resin material with reduction of the conveying capacity of the screw and to avoid also an adherence (bridging phenomenon) of the resin material to an opening of the feeding section which is caused by water vapor generated by an incoming heat from the barrel at a vicinity of the feeding section of the resin material or by a water contained in the resin material.

Still further, a compactor is provided in a feeding section of the resin material to enhance a filling rate of the resin material in a screw channel for induction of the generated water vapor into a vent of the tip portion.

Yet further, a compactor is provided in a feeding section of the resin material to enhance a filling rate of the resin material in a screw channel for enlarging a contacting area with a barrel wall face while increasing a heat transfer ratio from the barrel to obtain a rapid elevation of the temperature of the water containing resin material.

More further, at least one or more vent staffer means is provided in the upper stream of the vent portion, and a revolution of the screw of the vent staffer means is controlled according to the water content of the resin material or a quantity of the generating water vapor in order to prevent the water vapor generated in a large quantity from concentrating into the vent portion, and a propelling force against the extruder generated by a rotating force of the screw induces and controls a quantity of the discharged water vapor to each vent portion or a discharge rate of water.

The liquid removing device for a resin of high melting point, by means of a co-rotating twin extruder according to the invention is an extruder of the type in which the water containing resin material of high melting point is pressurized in the co-rotating twin screw to remove the water component for extrusion molding, wherein a vent portion is provided between a feeding section and an outlet of the resin material and a screw zone between the vent portion and the feeding section is formed into a melt-kneading screw for melting and/or kneading only but not for compressing, and a heating means is attached to the screw to form a melt-kneading section. The vent portion is comprised of an air opening vent and/or a vacuum vent for facilitating the vent functions. The melt-kneading section is comprised of a first screw zone of a full flighted screw for efficiently conveying resin materials from the feeding section, a second screw zone of a kneading block for separating and evaporating the water component while melt-kneading the resin material, a third screw zone of a kneading block for stabilizing a melting condition of the resin material while inducing the separated water vapor and other volatile components into the vent portion, a fourth screw zone of a full flighted screw for discharging the water vapor and other volatile components to the air opening vent and a fifth screw zone for sealing and comprised of a kneading block and/or a reverse full flighted screw for discharging under the vacuum the water vapor and other volatile components which are finally left by discharge. A screw zone is provided between the vent portion and the discharge to outlet provide a compression screw zone of a full flighted screw for mold-extruding the water free and devolatilized resin material under vacuum.

The first screw zone may employ a full flighted type single screw of a wide crest of which a filling rate of the resin material within a screw channel is increased.

Further, in the full flighted type single screw employed in the first screw zone, a screw pitch toward the diameter D is decreased toward the lower stream in the range of 1.5D–0.7D and a flight crest is decreased in the range of 0.4D–0.2D accordingly in order to gradually compress and convey the resin material.

Still further, a terminal portion of the first screw zone contacting with the second screw zone is successively changed from a single screw shape to a double screw shape in order to avoid retention of the resin material, and a single-double flighted screw is employed to avoid a risk of self-cleaning function for scraping a surface of the screw by the other.

Yet further, the second screw zone is comprised of a first half portion for sealing to prevent a reverse flow of the water vapor generated at the lower stream and a latter half portion for efficiently conveying while by melt-kneading forward the solid material of a great specific volume owing to a large quantity of air and water content.

The first half portion of the second screw zone may provide a notch type full flighted screw in which a plurality of channels are provided at almost right angles to the helical direction of the screw flighted portion to perform a sealing for preventing a reverse flow of the water vapor generated at the lower stream, a prompt heating of the resin material, an enhancement of the ratio into the screw channel and an increment of the contacting area with the barrel wall face.

Further, in the latter half portion of a second screw zone, a kneading blade having a thickness of 0.3D–0.5D against a diameter D of the screw and a wide width kneading block of a multi-stage with a helix angle $\alpha$ of 18°–30° in the same direction as the helical direction of the full flighted screw of the first screw zone are used at the L/D ratio of approximately 4–10 in order to disturb a formation of a path for discharging in forward water vapor generated by filling a screw channel with a solid material or semi-molten resin material having a large specific volume caused by containing a large quantity of air and water and to facilitate a prompt melting for reducing the specific volume.

Still further, a third screw zone provides a first half portion for performing melting stabilization and temperature elevation of the resin material of a state where the resin material is separated from the water vapor with a satisfactory discharge of the generated water vapor and a latter half portion as a buffer zone for operational stability by absorbing a transition of a melt starting point of the resin material or a removal and vaporization starting point of water caused by a fluctuation of water content of the supplied resin material.

In the second screw zone, the resin material is isolated into the water vapor and the molten or semi-molten resin to reduce the specific volume so that the resin material with the water vapor are likely flaked up from the vent portion of the fourth screw zone. To prevent this and attain a melt-stabilization as well as a temperature elevation of the resin material and an improved discharge of the removed and vaporized water and also to absorb transitions of the melt-starting point of the resin material or separation and vaporization starting (finishing) point of the water to be caused by a fluctuation of the water content of the supplied resin thereby to form a buffer zone against the water content fluctuation of the resin material, the third screw zone may provide at the L/D ratio in the range of approximately 4–12 a kneading block in which a kneading blade is combined in a staggered stage at a helix angle $\alpha$ of 30°–90° in the same direction as the helix of the full-flighted screw of the first screw zone.

Further, in an upper stream of an air opening vent and/or vacuum vent provided at least in more than one position with the L/D ratio of 5–20 from the tip portion to discharge water vapor generated at the second and the third screw zones, a vent staffer means comprising a horizontal or vertical type full flighted screw of single or twin screw may be provided between the vent portion and the third screw zone in order to avoid a flake up phenomenon where the molten resin together with a large quantity of discharged water vapor with a high speed is flaked up.

The vent staffer means may be arranged with the tip portion of the screw which is approximately 1–3 mm apart from an outer peripheral of the screw of the extruder may be arranged in order to prevent deterioration of quality of the mold and decrease of the operational stabilization to be caused by retention of the resin material.

Further, a vent staffer means arranged at an upper stream of one or more air opening vent and/or vacuum vent positioned at the L/D ratio of 5–20 from the tip portion, and in order to prevent a large quantity of water vapor from concentrating into only one air opening vent and/or vacuum vent at an up-most stream portion, a revolution of the screw is controlled according to a water content of the resin material or a quantity of water vapor to be generated so that a propelling force against the extruder generated by the revolution of the screw controls a quantity of the water vapor discharged from the respective vent portions or a discharge rate of the water vapor.

Still further, a delivery of water vapor and water of a vent staffer means may be provided in an upper face and a bottom face of a barrel of the vent staffer means in order to efficiently discharge the water vapor of high temperature and water which is liquidized within the barrel of the vent staffer means and/or an exhausting pipe connected thereto.

Yet further, the delivery of water vapor and water of the vent staffer means may be provided in each outside direction from a vertical central line of right and left axes of a twin screw in order to efficiently discharge the water vapor of high temperature and water which is liquidized within the barrel of the vent staffer means and/or an exhausting pipe connected thereto.

More further, the openings of the vent staffer means provides a manually or automatically exchangeable filter for collecting a negrigible amount of blowing out flakes.

An operation monitoring system for liquid removal molding of the resin of high melting point according to the present invention is characterized in that a water containing resin of high melting point is compressed in the co-rotating twin extruder for extrusion molding, where a vent portion is provided between a feeding section and an outlet of the extruder of the resin material, a screw zone is formed between the vent portion and the feeding section as a melt-kneading screw which serves only to melt and/or knead but not to compress, a screw is provided with a heating means to form a melt-kneading section, a water component is separated and vaporized in the melt-kneading section, the water vapor and other volatile components are induced into and discharged from the vent portion, a melt starting point of the resin material or a removal and vaporization starting point of water is transited by a fluctuation of water content of the resin material, a transition is absorbed by the fluctuation of a predetermined temperature of a barrel to monitor a fluctuation of the predetermined temperature of the barrel of a buffer zone for the operational stabilization and the fluctuation of the water content of the resin material is monitored to prevent a flake up phenomenon from the vent caused by a poor melting of the resin material.

The predetermination of the temperature of the barrel is controlled by providing a formula of $\alpha \geq \beta \geq \gamma$ wherein $+\alpha°$ C. is a melting point of the resin material or an alarm temperature of warning a risk of flake up caused by a poor melting in accordance with an increase of the water content of the resin material, and $+\gamma°$ C. is a melting point of the resin material or a control starting temperature for giving to the extruder an order of the gradual decrease of the feeding quantity of the material resulting from the decrease of the risk of flake up so that an automatic operation control for liquid removal molding of the resin of high melting point may conveniently be achieved in accordance with a fluctuation of water content different per each resin material batch.

The present invention of structure as hereinbefore described provides an operation monitoring system for a liquid removing system, a liquid removing method or a liquid removing device for the resin of high melting point by means of a co-rotating twin screw and a liquid remove molding of the resin of high melting point, wherein a liquid removal from a solid resin material or a high melting point resin having a water content of more than 10%, and a melting point, glass transition point, or heat distortion temperature extremely higher than a boiling point of water is performed at high effectiveness and at great capacity, and even stably.

According to the present invention, there is provided a melt-kneading portion comprising a plurality of screw zones formed between a feeding section through an outlet of the resin material of the co-rotating twin extruder, and a vent portion wherein a first screw zone serves to efficiently convey the resin material supplied from the feeding section, a second screw zone serves to remove and vaporize the water component by melt-kneading the resin material, a third screw zone serves to stabilize the melting condition of the resin material while inducing the removed water vapor and the other gas components into the vent portion at the lower stream to deal with a fluctuation of water content of the resin material and to perform an improved discharge of the water vapor in which a transition speed is decreased to elevate a filling rate of the resin material of high melting point in the screw channel in such range that a discharge path of the removed and vaporized water vapor is secured for enhancement of the melt-kneading capacity, a fourth screw zone is provided for an efficient discharge of the water vapor from the vent staffer means and the air opening vent of the vent portion preventing a flake up with a high transition speed without filling the screw channel with a molten resin, and a fifth screw zone serves to extremely decrease a transition speed and enhance a filling rate of the screw channel with the molten resin to form a vacuum sealing for efficient devolatilization and final water removal, and a pressurizing screw zone serves to mold-extrude the liquid free and vaporized resin material.

Accordingly, the screw structure from the first screw zone through the pressurizing screw zone of a co-rotating twin extruder according to the present invention is formed into a screw structure conforming to the conditions of each screw zone hereinbefore described in order to achieve a desired object conveniently.

According to the present invention, a fluctuation of the predetermined temperature of the barrel is monitored in the latter half portion of the third screw zone so that the fluctuation of water content of the resin material to be supplied is also monitored, and as a result, an operation monitoring system for liquid removing molding of the resin of high melting point is conveniently designed to prevent a flake up phenomenon from the vent portion to be caused by a poor melting of the resin material.

Further, the temperature of the barrel may be predetermined according to a relation with the melting point of the resin material and a temperature of the resin material for the ordinary molding, an alarm temperature for warning a risk of flake up caused by a poor melting in accordance with the increment of the water content of the resin material and a control starting temperature for giving to the extruder an order of the gradual decrease of the feeding quantity of the material resulting from the decrease of the risk of a flake up are predetermined to perform conveniently an automatic operation control system of a liquid removal molding of the resin of high melting point according to the fluctuation of water content different per each resin material batch.

DETAILED DESCRIPTION OF THE INVENTION

A method of removing a liquid from a resin of high melting point by means of a co-rotating twin extruder according to the present invention will be described in relation to an apparatus for working and with reference to the attached drawings.

Figure 1:
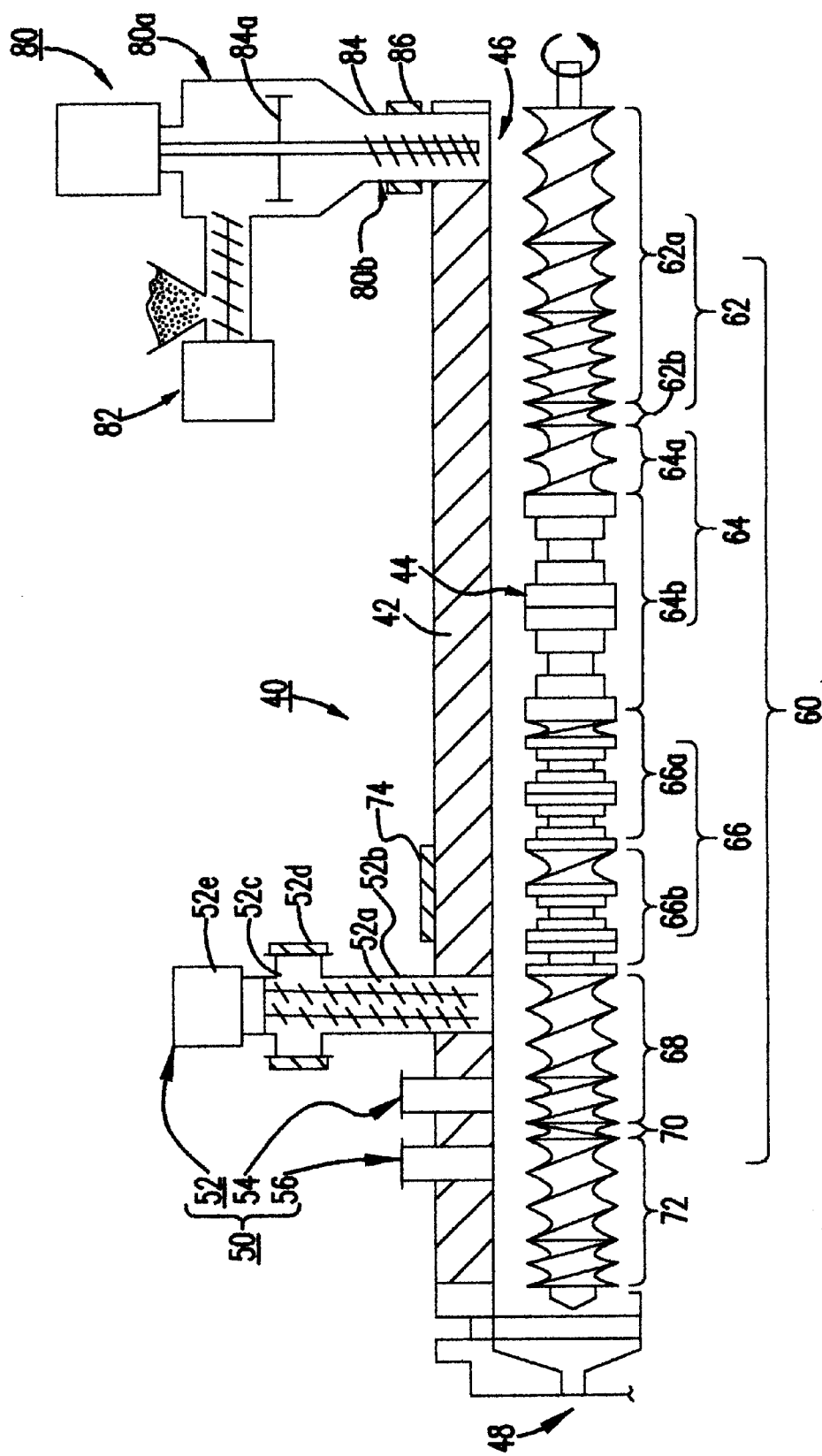
FIG. 1 is a schematic cross sectional view illustrative of an embodiment of a liquid removing device for a resin of high melting point by means of the co-rotating twin extruder according to the present invention.

In FIG. 1, a liquid removing device for the resin of high melting point by means of a co-rotating twin extruder according to the present invention is essentially comprised of a co-rotating twin extruder 40 and an attachment thereto.

Namely, the extruder 40 provides a co-rotating twin screw 44 which is inserted into a barrel 42 and a vent portion 50 in a position between a resin material feeding section (feeding throat) 46 and a mold delivery (outlet) 48. A screw zone is formed between the vent portion 50 and the feeding section 46 into a melt-kneading screw and the barrel 42 of a screw 44 is associated with a proper heating means (not shown) and the resin material feeding section 46 provides a compactor 80.

The vent portion 50 facilitates a vent function and comprises a vent staffer means 52 for controlling a flake up phenomenon, an air opening vent 54 and a vacuum vent 56. The number and structure are determined by a water content or processing capacity of the resin materials to be used. The vent staffer means 52 of the present embodiment is comprised of a co-rotating twin full flighted screw 52a which is adjustable in revolution.

The screw 44 provides in the melt-kneading portion 60 a first screw zone 62 comprising a full flighted screw for conveying efficiently the resin material from the feeding section 46, a second screw zone 64 comprising a kneading block for separating and evaporating a water component while melt-kneading the resin materials, a third screw zone 66 of a kneading block for stabilizing the melting condition of the resin material while inducing the removed water vapor and the other gas components to the vent portion 50 at the lower stream, a fourth screw zone 68 of a full flighted screw for discharging the water vapor to the air opening vent 54 and a fifth screw zone for vacuum sealing 70 of a kneading block and/or reverse full flighted screw for discharging under vacuum a finally remained water vapor and volatile components. Between the vent portion 50 and the discharge port 48 is provided a compression screw zone 72 of a full flighted screw for mold-extruding the liquid removed and devolatilized resin material under vacuum. The kneading block comprises a plurality of blocks in which a plurality of kneading blades are combined. The resin material to be fed from the feeding throat 46 has water content of 10% or more.

The first screw zone 62 includes a first half portion comprising a full flighted single screw 62a of a wide flight crest width and a latter half portion comprising a single-double coupling screw 62b.

Figure 2:
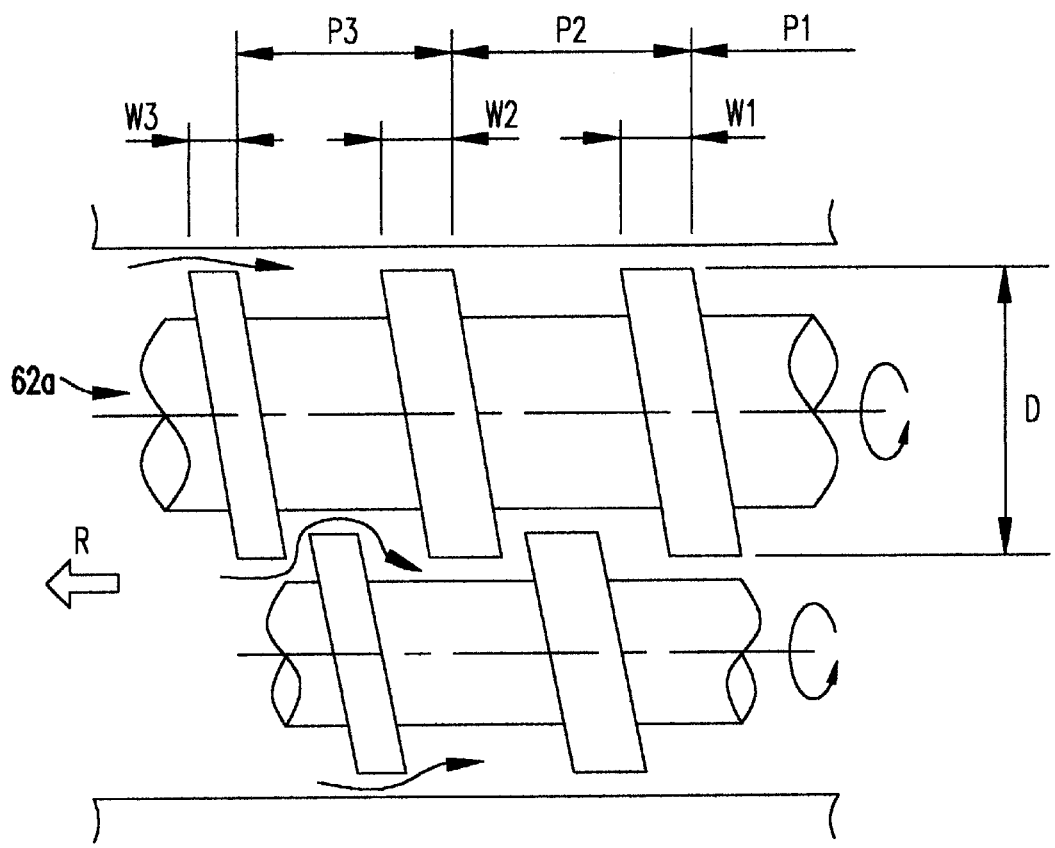
FIG. 2 is a schematic side view illustrative of a structure of a single screw 62a of the first screw zone as illustrated in FIG. 1.

Namely, the first screw zone 62 operates to prevent a reverse flow of the removed and vaporized liquid or gas into the resin material feeding section 46 and to increase the throughput with an improved conveying efficiency and results in an enhancement of the resin material filling rate into the screw channel. The single screw 62a is provided at a ratio of the length (L) to the diameter (D) (hereinafter referred to as L/D ratio) in the range of 8–16 and to compress the resin material gradually, the screw pitches of P1 through P3 are decreased in the range of 1.5D–0.7D toward the lower stream, and the flight crest widths among W1 through W3 are narrowed in the range of 0.4D–0.2D accordingly as shown in FIG. 2. The values are conveniently determined according to the processing volume or the liquid content of the resin material.

The terminal portion of the first screw zone 62 to which the second screw zone is made into contact provides a single-double coupling screw 62b to prevent retention of the resin material which results in the deterioration of the quality of the mold and the stabilization of the operation. The single-double coupling screw 62b is successively changed from a single screw shape to a double screw shape in order to avoid the self-cleaning function for scraping one of the surfaces by the other.

The second screw zone 64 includes a first half portion of a notch type full flighted screw and a latter half portion of a kneading block 64b.

Namely, for sealing to prevent a reverse flow of the removed and vaporized water in the lower stream, the first half portion of the second screw zone 64 provides a notch type full flighted screw 64a in which a plurality of channels are provided at almost right angle to the helical direction of the screw flighted portion. In the notch type full flighted screw 64a, a back flow of the resin material is occurred at the notch channel portion so that the filling rate in the screw channel is elevated and enabling to realize a filled condition at a relatively low pressure and accordingly to seal the reverse flow of the water vapor and water in an enlargement of the contacting area with the barrel and an improvement in heating of the resin material. Further, an intermesh length of the screws is decreased and an energy to be given from the screws to the resin material is diminished with reduction of the liquid to be removed from this area.

Figure 3:
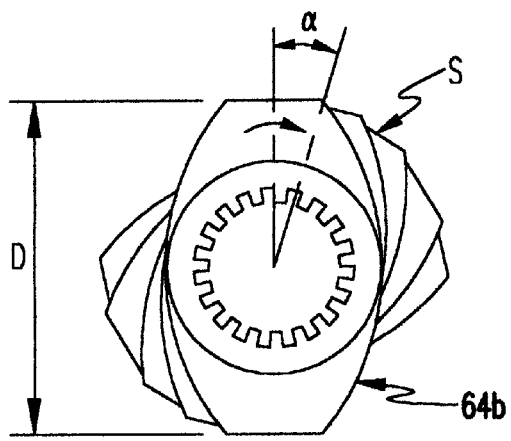
FIG. 3 is a schematic view illustrative of a structure of a kneading block 64b of the second screw zone as illustrated in FIG. 1.
Figure 4:
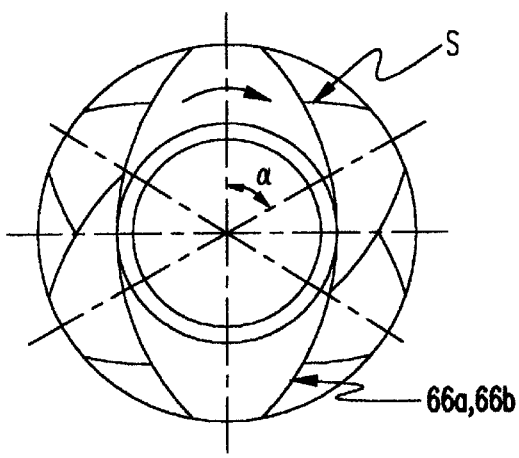
FIG. 4 is a schematic view illustrative of the kneading blocks 66a and 66b of the third screw zone as illustrated in FIG. 1.

In the latter half portion of the second screw zone 64, to carry out a melt-kneading of the solid resin material of large specific volume containing a large quantity of gas, water vapor and water while effectively conveying forward, provision is made of a kneading blade having a thickness of 0.3D–0.5D and a high conveying or transition ability with an excellent melt-kneading capacity as shown in FIG. 3 and of a wide width kneading block 64b of a staggered stage with a helix angle α of 18°–30° in the same direction as the helical direction of the notch type full flighted screw 64a used at the L/D ratio of approximately 4–10. In the kneading block 64b, the water vapor is commenced to generate, while, the resin material still being remained in solid or semi-molten form containing a large quantity of liquid with a relatively large specific volume. Accordingly, as shown in FIG. 4, when a kneading block having a slow transition speed of the resin material to be caused by a large clearance "S" of the adjacent kneading blade is employed, the screw channel is liable to fill with the resin material and disturbs a formation of a path for discharging the generated water vapor forward. As shown in FIG. 3, however, when a kneading block having a narrow width of the kneading blade with a high transition speed caused by a narrow clearance "S" of the adjacent kneading blade is employed, the melt-kneading of the resin material is not sufficiently carried out with poor separation and vaporizaion of water and the lower stream bears a large load. On the other hand, a wide width kneading block provides a small helix with a narrow clearance "S", and as a result, the back flow rate goes down with an increment of the transition speed and a reduction of a filling rate. Further, the large width of the kneading blade ensures an enlargement of the melt-kneading ability of the resin material.

The third screw zone 66 comprises kneading blocks 66a and 66b in the first half portion and the latter half portion respectively.

Namely, the first half portion of the third screw zone 66 is intended to perform the melting stabilization and the temperature elevation of the resin material from which liquid is removed and vaporized to realize an improved discharge of the generated water vapor with an increased filling rate in the screw channel in such range that a discharge path of the removed water vapor is secured and for this purpose provision is made of a kneading blade having a relatively low transition capacity but with an excellent melt-kneading capacity as shown in FIG. 4 and provided with a kneading block 66a of a staggered stage with a helix angle α of 30°–90° in the same direction as the kneading block 64b used at the L/D ratio of approximately 4–12. In the kneading block 66a, the resin material is separated into water vapor and molten or semi-molten resin at the second screw zone 64 so that the specific volume is decreased. Accordingly, in the kneading block 66a, a kneading block having a slower transition speed than the latter half portion of the second screw zone 64 or a larger helix angle is provided to secure a path for the sufficient water vapor. Further, in the fourth screw zone 68, the water vapor generated is discharged from the vent portion. Thus, to prevent a flake up phenomenon of the resin material from the vent portion, an enhancement of the melting stabilization of the resin material and an elevation of the resin temperature are required in an appropriate range. The kneading block having a large helix angle as described hereinbefore is well tolerated to such purpose.

In the latter half portion of the third screw zone 66, a kneading block 66b having the same structure as that of the first half portion of the kneading block 66a is provided as a buffer zone for the water content fluctuation of the resin material so that a transition (particularly at the lower stream) of a melt starting point of the resin material or a separation and vaporization starting (finishing) point of water caused by a fluctuation (particularly, increment) of water content of the feeding resin material is absorbed for stability of the operation. When the water content fluctuation of the resin material is negligible, this portion is not required to provide.

The fourth screw zone 68 is employed for an efficient discharge of the water vapor removed and vaporized from the air opening vent 54 and comprised of a full flighted screw having a high transition speed in order to prevent the screw channel from being filled with a molten resin. When a screw or kneading block of slow transition speed is employed to increase a filling rate in the screw channel, an efficient water vapor discharge is impeded with generation of a flake up.

The fifth screw zone 70 provides a kneading block or a reverse full flighted screw in order to extremely decrease a transition speed and enhance a filling rate of the screw channel with the molten resin so that a vacuum sealing is formed to effect an efficient devolatilization and a final water removal in the vacuum vent 56.

The compression screw zone 72 is a vacuum zone formed by a vacuum sealing of the fifth screw zone 70 and carries out a devolatilization or a final water removal through the vacuum vent 56 and is comprised of a full flighted screw of a high transition speed with an excellent conveying efficiency in order to mold-extrude the resin material from the mold delivery 48.

According to the embodiment, the vent staffer means 52 is provided in the fourth screw zone 68 to prevent a flake up of the molten resin with a large quantity of water vapor discharged from the air opening vent 54. The types of the vent staffer means 52 are diversified into a single or twin shape, corotational or multirotational, and vertical or horizontal type. The example shows a horizontal type co-rotating twin screw.

The vent staffer means 52 is comprised of a full flighted screw 52a for catching and pushing-back resin flakes flew up together with water vapor, a staffer barrel 52b for inserting and arranging the screw, discharge openings 52c for discharging water vapor, a screen portion 52d for catching a few flakes flew up and a driving means 52e of the screw.

The screw 52a of the vent staffer means 52 is required to have a distance (L) of 1 mm–3 mm from the tip portion of the screw to the periphery of the screw 44 of the co-rotating twin extruder 40. When the distance (L) is too wide, an abnormal retention of the resin material is developed with deterioration of the quality of the mold and reduction of the stabilization of the operation on account of an insufficient discharge of exhaust. Too narrow distance (L) may likely entail a mechanical contact between the screw 52a of the vent staffer means 52 and the screw 44 of the extruder 40 and an abnormal exotherm in an extremely narrow clearance.

Further, the screw 52a of the vent staffer means 52 is adjustable in revolution by the driving means 52e. Revolutions of the screw 52a are controlled to impart a bias of the propelling force against the extruder 40. Upon fluctuation of each water content according to different types of resin materials or batches, a quantity of water vapor to be generated from the vent staffer means 52 is varied. Hitherto, when the revolution is fixed in a high speed revolution, most water vapor is reverse flowed without any discharge in case of small quantity of water vapor, and the load to the vent portions 54, 56 at the lower stream grows heavy to likely cause a flake up. When the revolution is set in a low speed revolution, a flake up of the vent staffer means 52 is not suppressed in case of the large quantity of water vapor.

Discharge openings 52c of the vent staffer means 52 are respectively provided in an upper face and a bottom face of the staffer barrel 52b in order to efficiently discharge the water vapor and water which is liquidized within the staffer barrel 52b or in a connecting pipe (not shown). Alternatively, the openings 52c may be provided in each outside direction from a vertical central line of the screw 52a of the vent staffer means 52. Outside the openings 52c, the screen portions 52d of manually or automatically exchangeable filters are provided to catch a small amount of blowing out flakes.

In the embodiment, the resin material feeding throat 46 of the co-rotating twin extruder 40 provides a compactor 80 to which solid state water containing resin materials are constantly supplied by means of a weight feeder 82 of belt type or loss in weight type of a twin screw. A screw 84 of the compactor 80 may be formed into a single or twin screw, although the single screw is preferable to avoid any extra energy to be applied for the resin material.

The compactor 80 serves to prevent an adhesion (bridge phenomenon) of the resin material to the vicinity of the resin material feeding throat 46 of the extruder 40 to be caused by a water component and to force an inflow of the resin material into the extruder 40 despite of a reverse flow of the air and the water vapor. Accordingly, the constant feed is not carried out at the compactor 80 which, however, provides almost a starve feed in a steady state. Namely, the conveying capacity of the screw 44 of the resin material feed throat 46 of the extruder 40 is provided larger than that of the screw 84 of the compactor 80 to prevent the channel of the screw 84 of the compactor 80 from filling with the resin material.

The screw 84 of the compactor 80 is mounted in the barrel 42 of the extruder to prevent an adhesion or the bridge phenomenon of the resin material. The screw 84 of the compactor 80 may provide a scrape fin 84a to remove an adhesion of the resin material to the hopper 80a and a convenient cooling jacket 86 for suspending an elevation of the temperature of a cylinder 80b of the compactor 80 caused by a heat transfer or a radiation heat from the barrel 42 of the extruder 40.

Water containing resin material supplied to the extruder 40 by the compactor 80 is conveyed forward by the co-rotating twin screw 44 in which separation and vaporization of water and melt plastication are carried out and mold-extruded from the mold delivery 48 provided at the tip portion of the screw 44.

In accordance with the present invention, an essential arrangement as described hereinbefore may be subjected to a monitoring and a controlling as described later to achieve an optimum condition of operation of the liquid removed molding.

The resin material applied to the present invention contain a large quantity of water. An excessive of water content of generally 40% or more, however, reduces a cost performance as an industrial machine less than the conventional method and disturbs a supply of the resin material to the extruder. Accordingly, before supply of the resin material to the liquid removing extruder, the water content is reduced to 40% or less by means of a centrifugal liquid removing method and the like.

These liquid removing methods are, however, batch processes and the water content varies by 5% per each batch on account of the clogging of filters of the centrifugal dehydroextruder, and such fluctuation of the water content greatly affects to the liquid removing extruder using co-rotating twin extruder.

Generally, an evaporation latent heat of water is extremely large and a large quantity of energy is required to be imparted when the vaporization of water takes place within the extruder. In the device illustrated in FIG. 1, the liquid remove and evaporation of water takes place at the second screw zone 64 and the third screw zone 66 so that in those zones most energy supplied by the extruder 40 is consumed for vaporization of water, and as a result, a temperature of the barrel 42 of the extruder 40 which is heated by a heater or a heating medium goes down and has a great deflection from a predetermined temperature of around the melting point of the material. On the other hand, a deflection at a portion where a removal of the liquid and a full melting of the material are completed is relatively small and the temperature is close to the predetermined temperature.

When the water content of the resin material is increased, for example, more evaporation latent heat of water is required, and a zone where the separation and vaporization of water occur is enlarged and a time at which the separation and vaporization of water are completed is deflected to the lower stream of the extruder. A portion having a great deflection from the predetermined temperature of the barrel 42 is also prolonged to the down stream. When the zone having a great deflection is extended to the position of the first air opening vent 54, a poor melting of the resin material causes a blow up of the resin material from the air opening vent 54.

Monitoring of a fluctuation of the predetermined temperature of the barrel, particularly, the deflection of the temperature drop at a portion which is one or two barrels up-stream from the first air opening vent 54 or the vacuum vent 56 or the latter half portion of the third screw zone 66 ensures to hold a fluctuation or an increment of the water content of the resin material and to prevent the blow up of the resin material from the air opening vent 54.

The latter half portion of the third screw zone 66 provides a barrel temperature controller 74 which is in turn provided with a lower and further lower alarm output units for issuing alarms at each set temperature is provided. The lower signal recognizes a possibility of blow-up of the resin material from the air opening vent 54 for preparation of the necessary disposition. A further lower signal determines a blow-up of the resin material to change the operational conditions.

In general, a feeding quantity to a feeder is decreased with the necessary reduction of the screw velocity. A criterion of the reduction of the feeding quantity to the feeder is −(10–20)% of the feeding quantity of the resin material, provided that a fluctuation of an average water content of the centrifugal liquid removing device at the upper stream is approximately +5%. A temperature drop is caused by an increment of water content of the feeding resin material so that the water content of the feeding resin material may be provided less than the same quantity as that of the water content of the supplied resin material to be increased. After the feeding quantity of the resin material is decreased, a tendency of the deflection of the predetermined temperature of the barrel is monitored, and after the temperature drop is ceased for elevation, the feeding quantity of the resin material is gradually increased, and when the temperature drop is further continued, the feeding quantity of the resin material is decreased with reduction of the revolution of the screw.

As seen from the previous operation method, an operation of the liquid remove molding may conveniently be converted into the automatic control so that a tendency of the dropping deflection and speed of the predetermined temperature of the barrel at the latter half portion of the third screw zone 66 is always monitored. After the predetermined temperature is dropped over a lower most value and when the dropped temperature does not go back to a temperature over the lower limit value within a predetermined time or even still the temperature drop is continued, the feeder supply is gradually decreased at every constant interval. The screw velocity has a predetermined delay time against the gradual decrease of the feeding quantity and is gradually decreased to a Q/Ns value where Q denotes a quantity of extrusion, and Ns denotes a screw velocity at a steady state operation.

According to the foregoing conversion, a variation of the predetermined temperature of the barrel at the latter half portion of the third screw zone 66 is monitored and when the dropping rate of the temperature reaches zero and turns to increase, the gradual dropping operation is interrupted. Further, the predetermined temperature of the barrel is elevated over the lower limit value and still continued to elevate, a gradual elevation of the temperature opposite to the gradual dropping operation is slowly carried out while monitoring. By this control, an automatic operation of the liquid remove molding at the optimum operational conditions may be achieved to control a long periodical deflection caused by the deflection of the water content of the resin material.

The predetermination of the temperature of the barrel may conveniently be controlled by providing a formula of $\alpha \geq \beta \geq \gamma$ wherein $+\alpha°$ C. is a melting point of the resin material for the ordinary molding, $+\beta°$ C. is a melting point of the resin material for an alarm temperature for warning a risk of flake up caused by a poor melting in accordance with an increment of the water content of the resin material, and $+\gamma°$ C. is a melting point of the resin material for a control starting temperature for giving to the extruder an order of the gradual decrease of the feeding quantity of the material resulting from the reduction of the risk of a flake up.

With reference to FIGS. 5, 6, 7, and 8, the operational testing results determined by means of two testing apparatus for liquid removing methods according to the present invention shall hereinafter be described.

Figure 5:
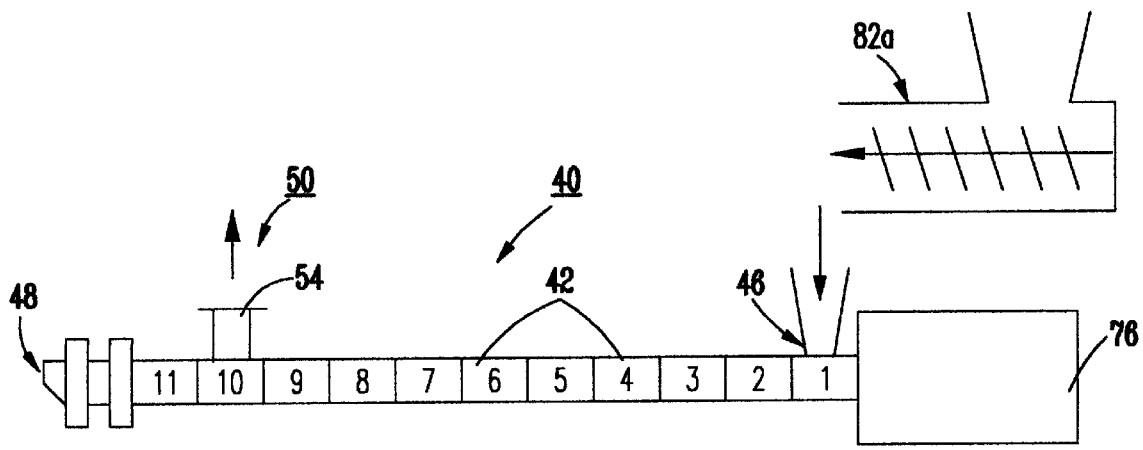
FIG. 5 is a schematic view illustrative of a first testing means of the liquid removing device as illustrated in FIG. 1.
Figures 6, 7:
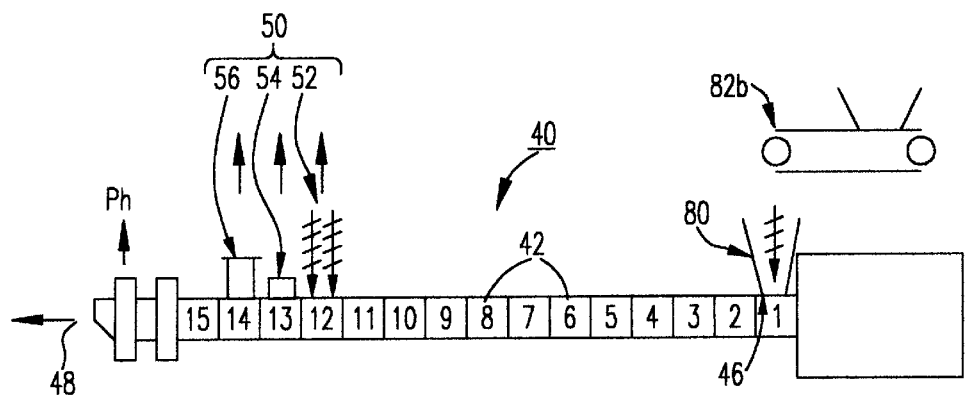
FIG. 6 is a diagram of the operational characteristics illustrative of the operation testing result of the first testing apparatus as illustrated in FIG. 5.
FIG. 7 is a schematic view illustrative of a second testing means of the liquid removing device as illustrated in FIG. 1.

EXAMPLE 1 (FIGS. 5 and 6)

In a first testing apparatus, to the co-rotating twin extruder 40 possessing the air opening vent 54 only and provided with screw ratio of length (L) to diameter (D) or L/D=44 was supplied a powdery engineering plastic of water content of 20%–30% for liquid-remove and subsequent mold-extrusion.

In the first testing apparatus, when as crew velocity Ns was 350 rpm, a quantity of material extrusion Q was 120 kg/H and a water content was 20%, a steady operation could be performed without any blow up from the vent portion 50 when the water content was increased to 30%, however, the steady operation was not attainable because of the increased blow up.

In the operational testing result of the first testing apparatus having the water content of 20%, a motor power Z, a power consumption rate Z/Q and a material highest (melting) temperature Tr were respectively Z=39 kW, Z/Q= 0.325 kWH/kg, and Tr=307° C.

Figures 8, 9:
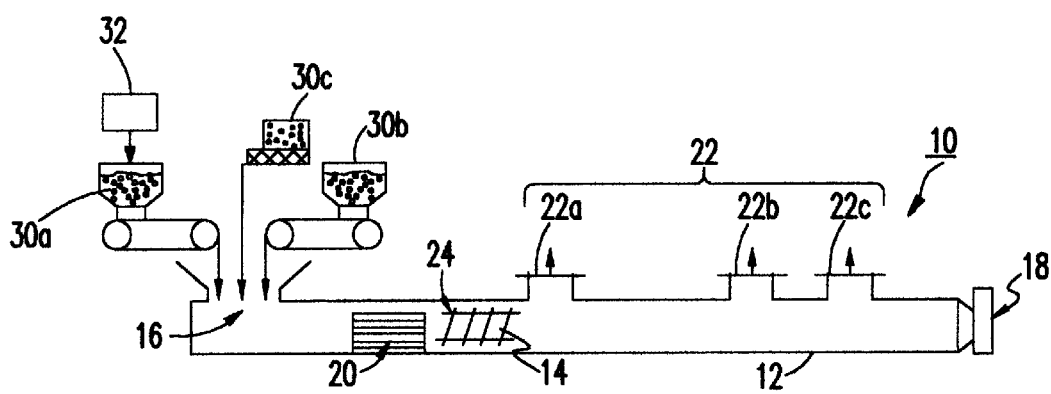
FIG. 8 is a diagram of the operational characteristics illustrative of the operation testing result of the second testing means as illustrated in FIG. 7.
FIG. 9 is a schematic view illustrative of a liquid removing system of the resin material by means of a conventional co-rotating twin extruder.
Figure 10:
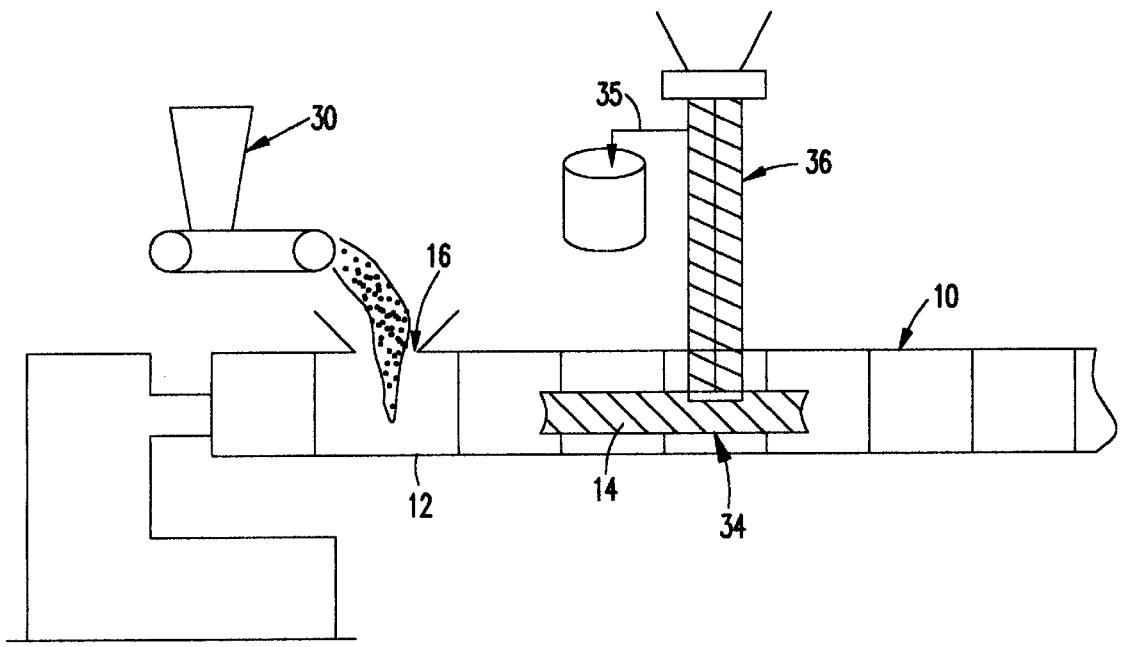
FIG. 10 is a schematic view illustrative of another liquid removing system for the resin material by means of a conventional co-rotating twin extruder.
Figure 11:
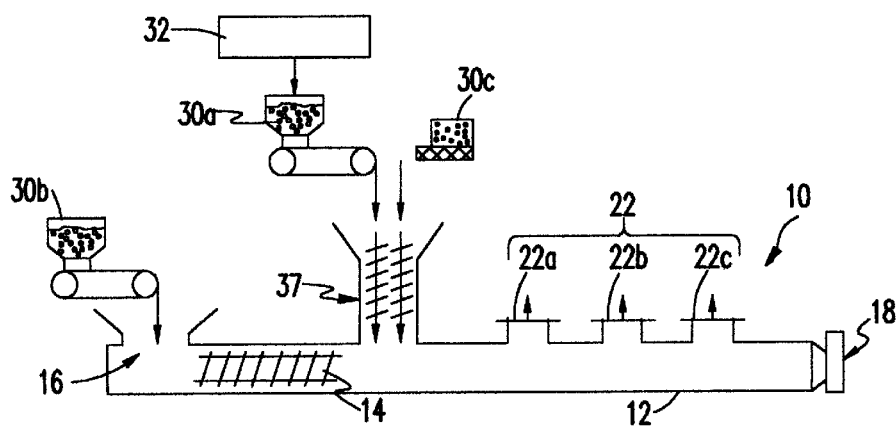
FIG. 11 is a schematic view illustrative of a further liquid removing system for the resin material by means of a conventional co-rotating twin extruder.

EXAMPLE 2 (FIGS. 7 and 8)

In a second testing apparatus, to the co-rotating twin extruder 40 possessing the vent portion 50 comprising the vent staffer means 52, the air opening vent 54 and the vacuum vent 56 and provided with screw ratio of length (L) to diameter (D) or L/D=60 was supplied a powdery engineering plastic having the water content of 30% from a single screw compactor 80 for liquid-remove and subsequent mold-extrusion.

In the second testing apparatus, no blow up from the vent portion 50 occurred and, a steady operation was achieved in case of the screw velocity Ns=350–500 rpm, a quantity of feeding material F=215–275 kg/H, and a quantity of material extrusion Q=155–199 kg/H.

In the operation testing result of the second testing apparatus, the motor power Z, the power consumption ratio Z/Q, the material highest melting temperature Tr, a resin pressure of head portion Ph, and a vacuum of the vacuum vent 56 VI were respectively Z=55–77.9 kW, Z/Q= 0.348–0.391 kWH/kg, Tr=304–309° C., Ph=1.0–2.1 kg/cm$^2$, and VI=−40—50 cm/Hg.

As seen from the aforementioned operation testing results, according to the present invention, a steady continuous operation of the resin material of high melting point is achieved. In this context, either operational testing results endorse a possibility of conveniently dealing with a fluctuation of the water content by providing a ratio of length to a diameter of screw (L/D) in large with an improved allowance of the separation and vaporization screw zone to the water content.

The preferred embodiments according to the present invention have been described hereinbefore, however, many variations on design may be available within a scope of the spirit of the invention but the invention is not limitative to the embodiments described.

As described hereinbefore, the method and the device for removing the liquid from the resin of high melting point by means of a co-rotating twin extruder according to the present invention is summarized to comprise a co-rotating twin extruder for melt-kneading in a screw a water-containing resin material of high melting point to remove the water component and produce a solid material, which provides a vent portion between a resin material feeding section and a mold delivery, and a screw zone between the vent portion and the feeding section for forming a predetermined melt-kneading portion in which the water component is removed and vaporized and the water vapor and other volatile components are induced into the vent portion so that even when the resin material of high melting point generates a large quantity of water vapor during the liquid removing process, the water vapor and the like are induced into and discharged from the vent portion without disturbing the flowability of the resin material and the generated water vapor.

According to the present invention, no deterioration of the screw function nor the flake up phenomenon occurs so that the spontaneous advantages of the liquid removing device of the extruder inclusive of a scaled down, high efficiency, high performance and continuous steady operation of the device may be secured.

The method and the device according to the present invention may contribute to a rationalization of a liquid removing and drying step in a polymer manufacturing process. The materials to be applied are resin materials of extremely higher melting point, glass transition point, or heat distortion temperature than the boiling point of water such as engineering plastics holding a solid form in shapes of powder, pellet, crumb, and flake is kept at around the room temperature.

Further, the method and the device according to the present invention also contributes to a rationalization of the liquid removing and drying step of a recycling process of the waste plastics. The materials to be applied are resin materials of extremely higher melting point, glass transition point, or heat distortion temperature than the boiling point of water such as engineering plastics holding a solid form in shapes of flake, fluff, and block of the ground plastic waste is kept at around the room temperature.

What is claimed is:

1. A liquid removing device for a water containing resin of high melting point by compressing the resin with a co-rotating twin extruder of a type in which a water containing resin material of high melting point is pressurized in a co-rotating twin screw for removing a water component for extrusion molding, wherein a vent portion is provided between a feeding section and an outlet of the resin material,
   a screw zone between the vent portion and the feeding section is formed into a melt-kneading screw for melting and/or kneading only but not for compressing,
   a heating means is associated with the screw to provide a melt-kneading section,
   said vent portion is providing an air opening vent and/or a vacuum vent for facilitating the vent functions,
   the melt-kneading section is comprised of a first screw zone of a flighted screw for efficiently conveying a resin material from the feeding section, a second screw zone of a kneading block for separating and evaporating a water component while melt-kneading the resin material, a third screw zone of a kneading block for stabilizing a melting condition of the resin material while inducing said separated water vapor and other volatile components into said vent portion, a fourth screw zone of a flighted screw for discharging said water vapor and other volatile components to the vent portion, and a fifth screw zone for sealing and comprised of a kneading block and/or a reverse flighted screw for discharging under the vacuum said water vapor and other volatile components which are finally left by discharge, and
   a screw zone between the vent portion and an outlet provides a compression screw zone of a flighted screw for mold-extruding the water free and a devolatilized resin material under the vacuum.

2. A liquid removing device for a resin of high melting point by means of a co-rotating twin extruder as claimed in claim 1, wherein the first screw zone employs a flighted type single screw having a thread pitch which provides an increased filling rate of the resin material within a screw channel.

3. A liquid removing device for a resin of high melting point by means of a co-rotating twin extruder as claimed in claim 2, wherein the flighted type single screw employed in the first screw zone provides a screw pitch toward the diameter D decreasing toward a lower stream in the range of 1.5D–0.7D and a flight crest is decreasing in the range of 0.4D–0.2D in order to gradually compress and convey the resin materials.

4. A liquid removing device for a resin of high melting point by means of a co-rotating twin extruder as claimed in claim 2, wherein a terminal portion of the first screw zone contacting with the second screw zone is successively changed from a single screw shape to a double screw shape in order to avoid retention of the resin material, and a single-double flighted screw is employed to avoid a risk of self-cleaning function for scraping a surface of the screw by the other.

5. A liquid removing device for a resin of high melting point by means of a co-rotating twin extruder as claimed in claim 1, wherein the second screw zone is comprised of a first half portion for sealing to prevent a reverse flow of water vapor generated at a lower stream and a latter half portion for efficiently conveying while by melt-kneading forward a solid material of a specific volume owing to a quantity of air and water content.

6. A liquid removing device for a resin of high melting point by means of a co-rotating twin extruder as claimed in claim 1, wherein a first half portion of the second screw zone provides a notch type flighted screw in which a plurality of channels are provided at an approximate right angle to the helical direction of a screw flighted portion to perform a sealing for preventing a reverse flow of water vapor generated at a lower stream, and a prompt heating of the resin material by increasing a melting stabilization of the resin material.

7. A liquid removing device for a resin of high melting point by means of a co-rotating twin extruder as claimed in claim 5, wherein a latter half portion of the second screw zone provides a kneading blade having a thickness of 0.3D–0.5D against a diameter D of the screw and a wide width kneading block of a multi-stage with a helix angle α of 18°–30° in the same direction as the helical direction of the full flighted screw of said first screw zone and used at an L/D ratio of approximately 4–10 in order to disturb a formation of a path for discharging in forward water vapor generated by filling a screw channel with a solid material or semi-molten resin material having the specific volume caused by containing the large quantity of air and water and to facilitate a prompt melting for reducing the specific volume.

8. A liquid removing device for a resin of high melting point by means of a co-rotating twin extruder as claimed in claim 1, wherein the third screw zone provides a first half portion for performing melting stabilization and temperature elevation of a resin material of a state where the resin material is separated from water vapor with a discharge of the generated water vapor, and
   a latter half portion as a buffer zone for operational stability by absorbing a transition of a melt starting point of a resin material or a removal and vaporization starting point of water caused by a fluctuation of water content of the supplied material.

9. A liquid removing device for a resin of high melting point by means of a co-rotating twin extruder as claimed in claim 8, wherein a resin material is isolated into water vapor and a molten or semi-molten resin in the second screw zone to reduce a specific volume of the third screw zone so that the resin material with the water vapor are flaked from the vent portion of the fourth screw zone, and to prevent the flaking and attain a melt-stabilization as well as a temperature elevation of the resin material and an improved discharge of the removed and vaporalized water and also to absorb transitions of a melt-starting point of the resin material or separation and vaporization starting (finishing) point of water to be caused by a fluctuation of a water content of the supplied resin thereby to form a buffer zone against a water content fluctuation of the resin material, and the third screw zone provides at an L/D ratio in the range of approximately 4–12 a kneading block in which a kneading blade is combined in a staggered stage at a helix angle α of 30°–90° in the same direction as the helix of the flighted screw of the first screw zone.

10. A liquid removing device for a resin of high melting point by means of a co-rotating twin extruder as claimed in claim 1, wherein an air opening vent and/or vacuum vent is provided at least in more than one position with an L/D ratio of 5–20 from a tip portion of an upper stream in order to discharge water vapor generated at said second and third screw zones, and a vent staffer means comprising a horizontal or vertical type flighted screw of single or twin screw is provided between a vent portion and said third screw zone in order to avoid a flake up phenomenon where a molten resin together with a quantity of discharged water vapor with a high speed are flaked up.

11. A liquid removing device for a resin of high melting point by means of a co-rotating twin extruder as claimed in claim 10, wherein said vent staffer means with a tip portion of a screw which is approximately 1–3 mm apart from an outer peripheral of the screw of the extruder is arranged in order to prevent deterioration of quality of the mold and decrease of an operational stabilization to be caused by retention of the resin material.

12. A liquid removing device for a resin of high melting point by means of a co-rotating twin extruder as claimed in claim 10, wherein a vent staffer means arranged at an upper stream of one or more air opening vent and/or vacuum vent positioned at an L/D ratio of 5–20 from a tip portion, and in order to prevent the quantity of water vapor from concentrating into only one air opening vent and/or vacuum vent at an up-most stream portion, a revolution of a screw is controlled according to a water content of a resin material or the quantity of water vapor to be generated so that a propelling force against the extruder generated by the revolution of the screw controls the quantity of the water vapor discharged from said respective vent portions or a discharge rate of the water vapor.

13. A liquid removing device for a resin of high melting point by means of a co-rotating twin extruder as claimed in claim 10, wherein a delivery of water vapor and water of a vent staffer means comprises openings in an upper face and a bottom face of a barrel of the vent staffer means in order to efficiently discharge the water vapor of high temperature and water which is liquidized within the barrel of the vent staffer means and/or an exhausting pipe connected to the vent staffer means.

14. A liquid removing device for a resin of high melting point by means of a co-rotating twin extruder as claimed in claim 10, wherein a delivery of water vapor and water of the vent staffer means comprises openings provided in each outside direction from a vertical central line of a right and a left axes of a twin screw in order to efficiently discharge the water vapor of high temperature and water which is liquidized within a barrel of the vent staffer means and/or an exhausting pipe connected to the vent staffer means.

15. A liquid removing device for a resin of high melting point by means of a co-rotating twin extruder as claimed in claim 13, wherein an opening of a vent staffer means provides a manually or automatically exchangeable filter for catching a predetermined amount of blowing out flakes.

16. An operation monitoring system for liquid removal and molding of a resin of high melting point, wherein the water containing resin of high melting point is compressed in a co-rotating twin extruder for the extrusion molding, a vent portion is provided between a feeding section and an outlet of the extruder of said resin material, a screw zone between a vent portion and the feeding section is formed as a melt-kneading screw which serves only to melt and/or knead but not to compress the resin, a screw is provided with a heating means to form a melt-kneading section and that in said melt-kneading section from which the water component is separated and vaporized, a water vapor and other volatile components are induced into and discharged from the vent portion, a melt starting point of the resin material or a removal and vaporization starting point of water is transited by a fluctuation of water content of the resin material, and the transition is absorbed by a fluctuation of a predetermined temperature of a barrel to monitor a fluctuation of the predetermined temperature of the barrel of a buffer zone for operational stabilization and the fluctuation of the water content of the resin material is monitored to prevent a flake up phenomenon from said vent caused by a poor melting of the resin material.

17. An operation monitoring system for liquid removal and molding of a resin of high melting point as claimed in claim 16, wherein a predetermination of a temperature of said barrel is controlled by providing a formula of $\alpha \geq \beta \geq \gamma$ wherein $+\alpha°$ C. is a melting point of the resin material for the ordinary molding, $+\beta°$ C. is a melting point of the resin material for an alarm temperature for warning a risk of flake up caused by a poor melting in accordance with the increase of the water content of the resin material, $+\gamma°$ C. is a melting point of the resin material for a control starting temperature for giving to the extruder an order of gradual decrease of a feeding quantity of a material resulting from a decrease of a risk of a flake up, and an automatic operation control system for a liquid remove molding of a resin of high melting point corresponding to a fluctuation of water content different per each resin material batch is conveniently achieved.

* * * * *